United States Patent
Kato (10) Patent No.: US 6,893,757 B2
(45) Date of Patent: May 17, 2005

(54) FUEL CELL APPARATUS AND METHOD OF CONTROLLING FUEL CELL APPARATUS

(75) Inventor: Kenji Kato, Aichi (JP)

(73) Assignee: KabushikiKaisha Equos Research (JP)

( * ) Notice: Subject to any disclaimer, the term of this patent is extended or adjusted under 35 U.S.C. 154(b) by 384 days.

(21) Appl. No.: 10/052,408

(22) Filed: Jan. 23, 2002

(65) Prior Publication Data

US 2002/0102447 A1 Aug. 1, 2002

(30) Foreign Application Priority Data

Jan. 26, 2001 (JP) ........................................ 2001-018284
Jan. 26, 2001 (JP) ........................................ 2001-018363

(51) Int. Cl.[7] ............................ H01M 8/04; H01M 8/12
(52) U.S. Cl. ............................................ 429/23; 429/25
(58) Field of Search ............................ 429/22, 23, 25, 429/38, 39

(56) References Cited

U.S. PATENT DOCUMENTS

| | | | | |
|---|---|---|---|---|
| 3,753,780 A | * | 8/1973 | Fetterman | 429/23 |
| 5,334,463 A | * | 8/1994 | Tajima et al. | 429/9 |
| 5,677,073 A | * | 10/1997 | Kawatsu | 429/22 |
| 6,447,939 B1 | * | 9/2002 | Iwasaki | 429/9 |

* cited by examiner

Primary Examiner—Patrick Joseph Ryan
Assistant Examiner—Julian Mercado
(74) Attorney, Agent, or Firm—Lorusso & Loud (57) ABSTRACT

A fuel cell apparatus includes a fuel cell connected directly to a load. An electricity accumulation circuit including an electricity accumulator is connected in parallel to the fuel cell. The electricity accumulator supplies electric power to the load when electric power supplied by the fuel cell is less than electric power that the load requires. The electricity accumulator is charged by regenerative power generated at the load and electric power output from the fuel cell. The fuel cell outputs electric power within a predetermined range.

12 Claims, 6 Drawing Sheets

FUEL CELL APPARATUS AND METHOD OF CONTROLLING FUEL CELL APPARATUS

BACKGROUND OF THE INVENTION

1. Field of the Invention

The present invention relates to a fuel cell apparatus and to a method of controlling the fuel cell apparatus.

2. Description of the Related Art

Conventionally, fuel cells, which are high in power generation efficiency and exhaust no toxic substance, have been put into practical use as a power generation apparatus for industrial use or home use or as a power source of an artificial satellite, spacecraft, or the like. Meanwhile, in recent years, developments toward use of a fuel cell as a power source of a vehicle such as automobile, bus, or truck have progressed.

Such a vehicle includes many auxiliary apparatuses, such as lights, a radio, and power windows, which consume electricity even when the vehicle is stopped, and such a vehicle travels in various patterns. Therefore, a power source used in a vehicle is required to supply sufficient power in a considerably wide range of operation conditions. Accordingly, when a fuel cell is used as a power source for a vehicle, a hybrid system which includes a battery (storage battery or secondary battery) as well as a fuel cell is generally employed.

Figure 1:
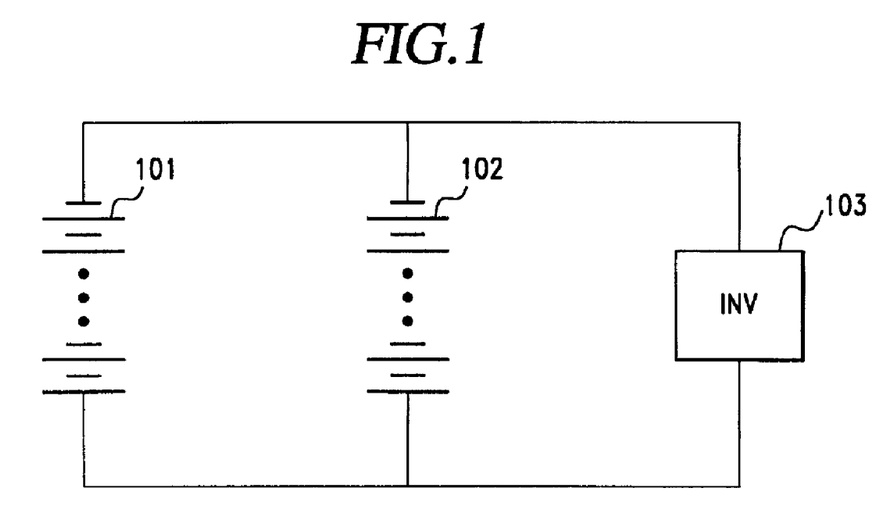
FIG. 1 is a diagram showing a conventional fuel cell apparatus.

FIG. 1 shows a conventional fuel cell apparatus.

In FIG. 1, reference numeral 101 denotes a fuel cell, which is generally a polymer electrolyte membrane fuel cell (PEMFC), but may be an alkaline fuel cell (AFC), a phosphoric acid fuel cell (PAFC), a molten carbonate fuel cell (MCFC), a solid oxide fuel cell (SOFC), or a direct methanol fuel cell (DMFC).

Reference numeral 102 denotes a battery which can repeat discharge upon charging, such as a lead-acid battery, a nickel-cadmium battery, a nickel-hydrogen battery, a lithium ion battery, or a sodium sulfur battery.

Reference numeral 103 denotes an inverter (INV). The inverter 103 converts direct current output from the fuel cell 101 or the battery 102 to alternating current and supplies the alternating current to an unillustrated AC motor which serves as a drive source for rotating wheels of a vehicle. Notably, when the drive source is a DC motor, the direct current output from the fuel cell 101 or the battery 102 is supplied directly to the drive source without passing through the inverter 103.

In the fuel cell apparatus having the above-described configuration, the fuel cell 101 and the battery 102 are connected in parallel so as to supply electric power to the inverter 103. Therefore, electric power is automatically supplied from the battery 102 to the inverter 103 when the fuel cell 101 stops upon stoppage of the vehicle or when the fuel cell 101 becomes unable to supply a required power during heavy load operation, such as while traveling uphill.

Meanwhile, when the vehicle decelerates, the AC motor serving as a drive source functions as a generator so as to generate regenerative electric power. In such a case, the regenerative electric power is supplied to the battery 102, which is charged again. Further, when the terminal voltage of the battery 102 drops due to discharge, electric power generated by the fuel cell 101 is automatically supplied to the battery 102.

As described above, in the fuel cell apparatus, the battery 102 is charged at all times, and electric power is automatically supplied from the battery 102 to the inverter 103 when the fuel cell 101 becomes unable to supply a required level of power. Therefore, the vehicle can be operated stably in various traveling modes.

However, in the conventional fuel cell apparatus, since the fuel cell 101 and the battery 102 are simply connected in parallel without any control for controlling the current ratio between the fuel cell 101 and the battery 102, the current of the fuel cell 101 and the current of the battery 102 are determined by their current-voltage characteristics.

Therefore, the battery 102 always supplies electric power, and thus, the battery 102 must have a large capacity. Since the battery is generally large, heavy, and expensive, increasing the capacity of the battery 102 results in corresponding increases in volume, weight, and cost of the vehicle.

In the case in which the terminal voltages of the fuel cell 101 and the battery 102 are set so as to reduce the voltage difference therebetween, even when the terminal voltage of the battery 102 drops due to discharge, large current does not flow from the fuel cell 101 to the battery 102, with the result that charging the battery 102 requires a long time. When the terminal voltages of the fuel cell 101 and the battery 102 are set so as to increase the voltage difference therebetween, large current (electric power) flows from the fuel cell 101 to the battery 102, with the result that the battery 102 may be broken due to overcharging.

Moreover, in general, the voltage-current characteristic of a battery varies with the remaining capacity, which makes it difficult to maintain a predetermined ratio of output between the fuel cell 101 and the battery 102 to thereby allow the fuel cell 101 and the battery 102 to exhibit their original current-voltage (or electric power) characteristics. Therefore, the following problems may occur. Even when the fuel cell 101 becomes unable to supply a required power during heavy load operation, such as while traveling uphill, no electric power is supplied from the battery 102 to the inverter 103, and thus, traveling of the vehicle is restricted. Even when the remaining capacity of the battery 102 decreases, no electric power is supplied from the fuel cell 101 to the battery 102, with the result that the battery 102 becomes dead.

In order to solve the problems involved in the conventional fuel cell apparatus, the present inventor has proposed an improved fuel cell apparatus and an improved method of controlling a fuel cell apparatus (see Japanese Patent Application No. 2000-362597).

The fuel cell apparatus comprises a fuel cell, a load connected to output terminals of the fuel cell, and an electricity accumulation circuit including an electricity accumulator and connected in parallel to the fuel cell. The electricity accumulator supplies electric power to the load when electric power supplied from the fuel cell is less than electric power required by the load. The electricity accumulator is charged by regenerative electric power generated at the load and electric power generated by the fuel cell. The electricity accumulation circuit further includes a step-up circuit for increasing voltage output from the electricity accumulator and for supplying electric power to the load; a charging circuit for supplying to the electricity accumulator electric power output from the fuel cell in order to charge the electricity accumulator; and traveling condition detection means for detecting the traveling state of the vehicle. The step-up circuit and the charging circuit are selectively operated in accordance with the traveling state of the vehicle as detected by the traveling condition detection means.

The method is adapted to control a fuel cell apparatus which includes a fuel cell having terminals connected to a load; and an electricity accumulation circuit connected in parallel to the fuel cell and including a step-up circuit, a charging circuit, and an electricity accumulator, wherein the method controls electric power charged into the electricity accumulator and electric power supplied from the electricity accumulator to the load.

The fuel cell apparatus and the method of controlling a fuel cell apparatus proposed by the present inventor have solved the problems of the conventional fuel cell apparatus. Thus, it becomes possible to properly control the current (electric power) ratio between the fuel cell and the battery to thereby enable proper charging of the battery, prevent the capacity of the battery from increasing, and maintain a predetermined ratio of output between the fuel cell and the battery.

However, the fuel cell apparatus and the method of controlling a fuel cell apparatus proposed by the present inventor premise that the performance and operation of the fuel cell are stable at all times and that the fuel cell outputs electric power constantly. If a large load is imposed on the fuel cell, the temperatures of the electrolyte film and the electrodes of the fuel cell increase, and in the worst case, the electrolyte film and the electrodes burn out. Even in the case in which the electrolyte film and the electrodes do not burn out, the performance of the fuel cell deteriorates greatly, or the operation becomes unstable. Meanwhile, in order to enable the fuel cell to output electric power constantly, fuel such as hydrogen gas must be supplied to the fuel cell at a constant rate. If the flow rate of the supplied fuel gas becomes lower than the flow rate that the fuel cell requires to output a required electric power, carbon or other components contained in members that constitute the fuel cell cause reaction, with the result that the fuel cell burns out. On the other hand, when the pressure of the supplied fuel gas is excessively high, a member that constitutes the fuel cell may be broken.

SUMMARY OF THE INVENTION

An object of the present invention is to solve the problems involved in the fuel cell apparatus proposed by the present inventor and to provide a fuel cell apparatus and a method of controlling a fuel cell apparatus in which load imposed on a fuel cell is controlled to fall within a predetermined range and the flow rate of a fuel supplied to the fuel cell is controlled to a proper level, whereby stable operation is realized at all times, while damage to the fuel cell and deterioration of the performance of the fuel cell are prevented.

The present invention provides a fuel cell apparatus comprising: a fuel cell connected to a load; an electricity accumulator connected to the load via a step-up circuit, the electricity accumulator supplying electric power to the load and being charged by regenerative electric power generated at the load and electric power output from the fuel cell; and a control circuit, wherein, when electric power that the load requires is greater than a predetermined electric power that the fuel cell supplies, the control circuit causes the electricity accumulator to output via the step-up circuit electric power corresponding to a difference between the electric power required by the load and the predetermined electric power, to thereby prevent the fuel cell from supplying electric power greater than the predetermined electric power.

In the fuel cell apparatus, when the electric power required by the load exceeds the maximum output power of the fuel cell, a shortfall of the required power is supplied from the electricity accumulator. Further, since the electricity accumulator is charged properly by, for example, regenerative power, the electricity accumulator does not go flat.

Moreover, since the output power of the fuel cell does not exceed the predetermined range, the fuel cell is not damaged, can maintain the desired performance, and can provide stable operation at all times.

The present invention provides another fuel cell apparatus comprising a fuel cell connected to a load, and an electricity accumulation circuit connected in parallel to the fuel cell, wherein the electricity accumulation circuit comprises: an electricity accumulator; a step-up circuit for increasing voltage output from the electricity accumulator and for supplying increased voltage to the load; a charging circuit for supplying electric power output from the fuel cell to the electricity accumulator so as to charge the electricity accumulator; and a traveling state detector for detecting the traveling state of a vehicle, wherein the step-up circuit and the charging circuit are operated selectively in accordance with the traveling state of the vehicle as detected by the traveling state detector, and the step-up circuit is operated in such a manner that the fuel cell outputs electric power within a predetermined range.

Although the fuel cell apparatus has a simple configuration, the fuel cell apparatus can control the SOC of the electricity accumulator properly. Therefore, regenerative current (electric power) can be used to a possible extent without being wasted, and thus the fuel gas for the fuel cell can be saved. In addition, the capacity of the electricity accumulator is not required to increase over and above that which is desired. Further, electric power corresponding to the required power is properly supplied from the fuel cell and the electricity accumulator. Moreover, since the electricity accumulator is charged properly by, for example, regenerative power, the electricity accumulator does not go flat. Furthermore, since the output power of the fuel cell does not exceed the predetermined range, the fuel cell is not damaged, can maintain the desired performance, and can provide stable operation at all times.

The present invention provides still another fuel cell apparatus comprising a fuel cell connected to a load, an electricity accumulation circuit connected in parallel to the fuel cell, and a diode element for preventing supply of electric power from the load or the electricity accumulation circuit to the fuel cell, wherein the electricity accumulation circuit comprises: a switching element for charging and a switching element for step-up connected in series; an electricity accumulator connected in parallel to the switching element for step-up via a reactor; and a traveling state detector for detecting the traveling state of a vehicle, wherein the switching element for step-up and the switching element for charging are operated selectively in accordance with the traveling state of the vehicle as detected by the traveling state detector, and the switching element for step-up is operated in such a manner that the fuel cell outputs electric power within a predetermined range.

Although the fuel cell apparatus has a simple configuration, the fuel cell apparatus can control the SOC of the electricity accumulator properly. Therefore, regenerative current can be used to a possible extent without being wasted, and thus the fuel gas for the fuel cell can be saved. In addition, since the output voltage of the electricity accumulator can be increased properly, electric power corresponding to the required power is properly supplied from the electricity accumulator. Moreover, since the electricity accumulator is charged properly by, for example, regenerative power, the electricity accumulator does not go flat.

Furthermore, since the output power of the fuel cell does not exceed the predetermined range, the fuel cell is not damaged, can maintain the desired performance, and can provide stable operation at all times.

The load may be a drive control unit for a drive motor which drives the vehicle.

Although the fuel cell apparatus has a simple configuration, electric power corresponding to the required power is properly supplied from the fuel cell and the electricity accumulator, so that traveling of the vehicle is not hindered.

Preferably, the fuel cell outputs electricity in such a manner that output voltage does not become lower than the lowest generatable voltage, output current does not exceed the maximum generatable current, and output power does not exceed the maximum output power.

In this case, the electrolyte films and electrodes of the fuel cell are not damaged.

Preferably, the electricity accumulator outputs electricity when the electric power that the load requires exceeds the maximum output power of the fuel cell.

In this case, the output of the electricity accumulator is controlled by means of feed-forward control, and therefore, high-speed control with quick response can be attained.

Preferably, the electricity accumulator outputs electricity when output voltage of the fuel cell becomes lower than the lowest generatable voltage, when output current of the fuel cell exceeds the maximum generatable current, or when output power of the fuel cell exceeds the maximum output power.

In this case, the output of the fuel cell is controlled by means of feedback control, and therefore, demand of the load can be complied with reliably.

Preferably, fuel gas is supplied from a fuel storage unit to the fuel cell at constant pressure.

In this case, since the fuel gas supplied to the fuel cell has a proper pressure, the fuel cell is not damaged and can output current in a stable manner.

Preferably, the fuel cell apparatus further comprises a fuel supply apparatus for supply fuel gas to the fuel cell, the fuel supply apparatus comprising a fuel storage unit, a line connected to the fuel cell, and a valve disposed in the line, wherein the valve is operated in such a manner that the fuel gas is supplied to the fuel cell at constant pressure.

In this case, since the fuel gas supplied to the fuel cell has a proper pressure, the fuel cell is not damaged and can output current in a stable manner.

Preferably, the fuel gas is supplied in such a manner that the pressure of the fuel gas becomes constant within grooves of fuel electrodes of the fuel cell.

In this case, the fuel electrodes of the fuel cell are not damaged.

Preferably, the line includes a fuel supply line and a fuel discharge line; a fuel supply solenoid valve is disposed in the fuel supply line; and a fuel discharge solenoid valve is disposed in the fuel discharge line, wherein the fuel supply solenoid valve and the fuel discharge solenoid valve are turned on and off in order to regulate the pressure of the fuel gas.

In this case, the structure of the apparatus can be simplified, and cost can be reduced.

Preferably, a fuel pressure regulation valve is disposed in the line and is operated in order to regulate the pressure of the fuel gas.

In this case, the accuracy in controlling the pressure of the fuel gas supplied to the fuel cell is increased, and the fuel efficiency of the fuel cell can be improved. Therefore, the overall economy of the fuel cell apparatus is improved.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will now be described in detail with reference to the drawings.

Figure 2:
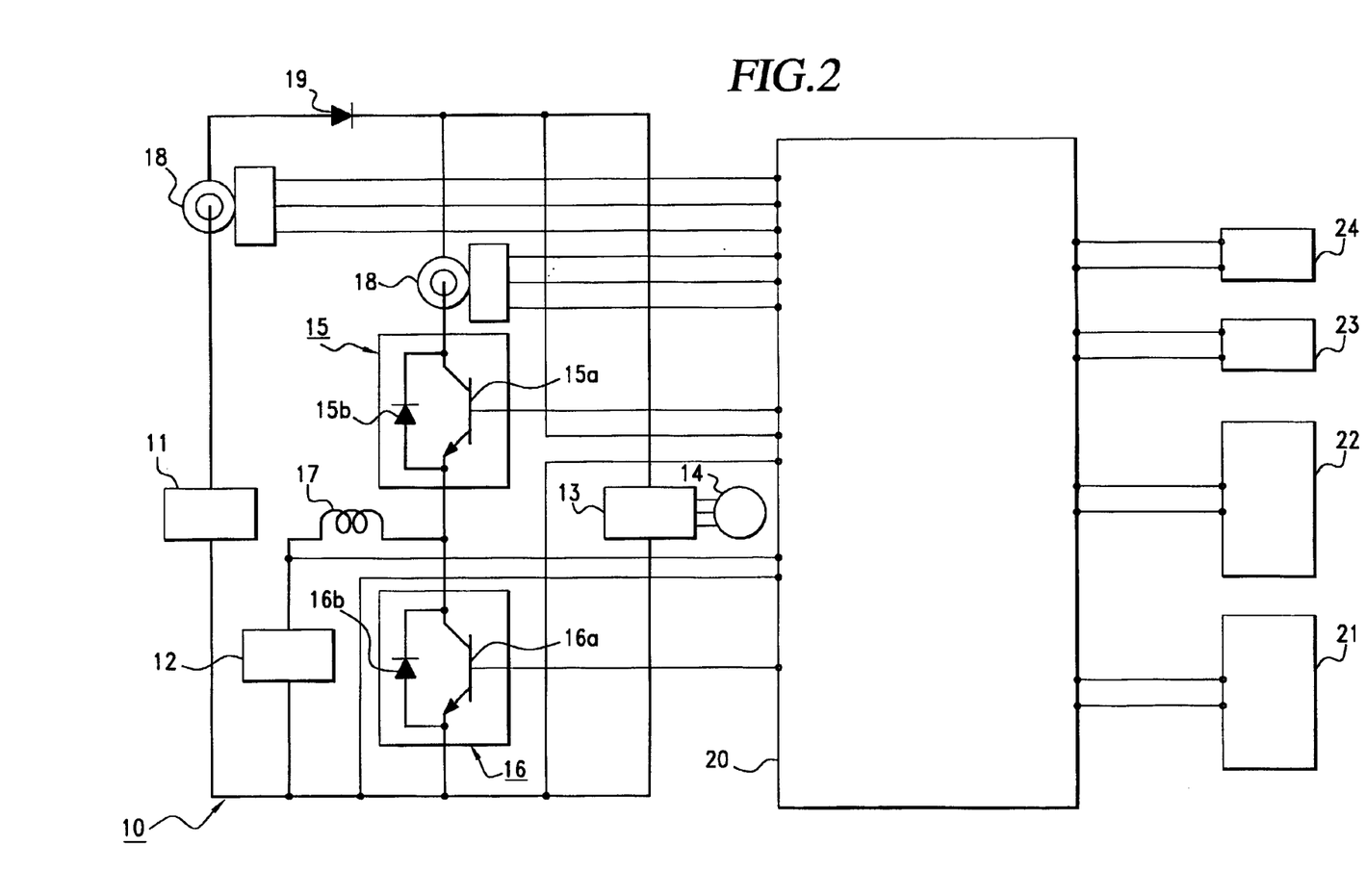
FIG. 2 is a conceptual view of a fuel cell apparatus according to a first embodiment of the present invention.
Figure 3:
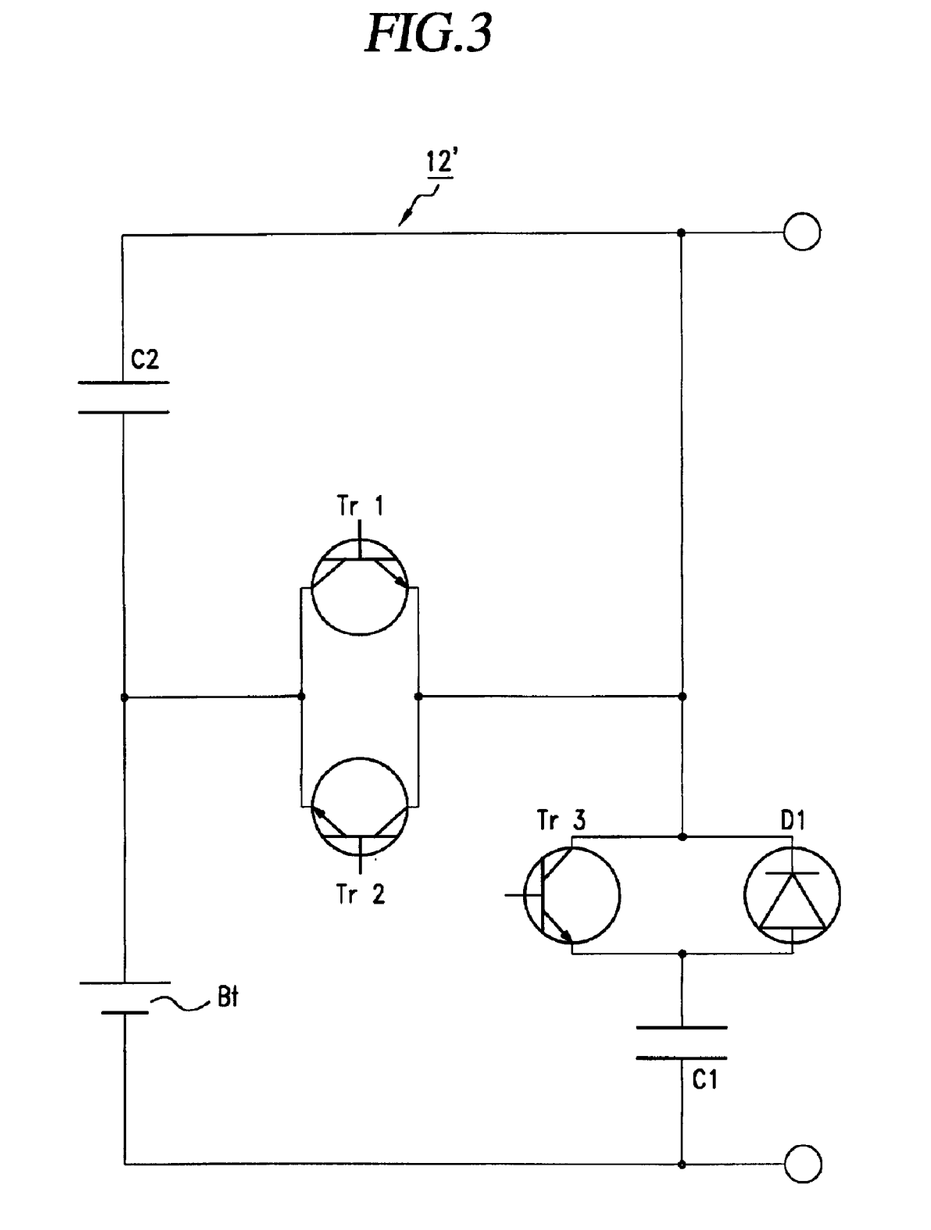
FIG. 3 is a diagram showing an example of the electricity accumulator used in the first embodiment of the present invention in which a battery and electric double layer capacitors are combined.

FIG. 2 is a conceptual view of a fuel cell apparatus according to a first embodiment of the present invention; and FIG. 3 is a diagram showing an example of the electricity accumulator used in the first embodiment of the present invention in which a battery and electric double layer capacitors are combined.

In FIG. 2, reference numeral 10 denotes a fuel cell (FC) circuit, which is used as a power source of a vehicle such as automobile, bus, or truck. The vehicle includes auxiliary apparatuses, such as lights, a radio, and power windows, which consume electricity even when the vehicle stops, and the vehicle travels in various patterns. Therefore, a power source used in a vehicle is required to supply sufficient power in a considerably wide range of operation conditions. Accordingly, a fuel cell 11 and a battery 12 serving as an electricity accumulator are used in combination as a power source.

The fuel cell 11 is preferably a polymer electrolyte membrane fuel cell (PEMFC), but may be an alkaline fuel cell (AFC), a phosphoric acid fuel cell (PAFC), a molten carbonate fuel cell (MCFC), a solid oxide fuel cell (SOFC), or a direct methanol fuel cell (DMFC).

More preferably, the fuel cell 11 is a PEM (proton exchange membrane)-type fuel cell which uses hydrogen gas as a fuel and oxygen or air as an oxidizer. The PEM-type fuel cell is generally composed of a stack of a plurality of serially connected cells. Each cell includes a polymer film through which ions such as protons can pass; and a catalyst layer, an electrode, and a separator are attached to either side of the polymer film (see Japanese Patent Application Laid-Open (Kokai) No. 11-317236).

In the present embodiment, a PEM-type fuel cell including a stack of 400 serially connected cells is used. In this case, the PEM-type fuel cell has a total electrode area of 300 cm$^2$, an open-circuit terminal voltage of about 360 V, and an output of about 42 kW. The temperature during steady operation is about 50 to 90° C.

Hydrogen gas serving as a fuel gas may be obtained through reformation of, for example, methanol or gasoline performed by use of an unillustrated reforming apparatus, and supplied directly to the fuel cell 11. However, in order to stably supply hydrogen at a sufficient flow rate even during heavy load operation of the vehicle, hydrogen gas is preferably supplied from a fuel storage unit such as a hydrogen storage alloy or a hydrogen gas cylinder. In this case, since hydrogen gas is always supplied at a sufficient flow rate under a substantially constant pressure, the fuel cell 11 can supply required electric power while following variation in the load of the vehicle without any delay.

In this case, the output impedance of the fuel cell 11 is considerably low and can be approximated to zero.

In FIG. 2, reference numeral 12 denotes a secondary battery (or storage battery), which serves as an electricity accumulator which can repeat discharge upon charging, such as a lead-acid battery, a nickel-cadmium battery, a nickel-hydrogen battery, a lithium ion battery, or a sodium sulfur battery. Of these, a high performance lead-acid battery, lithium ion battery, or sodium sulfur battery used in electric cars and other applications is preferred.

The present embodiment employs a high performance lead-acid battery which has an open-circuit terminal voltage of about 210 V and a capacity for enabling supply of a power of about 10 kW over a period of about 5 to 20 min.

The electricity accumulator is not limited to the battery and may assumes any form insofar as the electricity accumulator can electrically accumulate and discharge energy. Examples of the electricity accumulator include a capacitor such as an electric double layer capacitor, a flywheel, a superconductive coil, and a pressure accumulator. These components may be used singly or in combination.

For example, as described in Japanese Patent No. 2753907, the battery may be combined with electric double layer capacitors in order to constitute the electricity accumulator, as shown in FIG. 3. In the electricity accumulator 12' of FIG. 3, a battery Bt is connected in series to a capacitor C2. Specifically, the positive terminal of the battery Bt is connected to the negative terminal of the capacitor C2. The positive terminal of the battery Bt is also connected to the collector of a transistor Tr1 and the emitter of a transistor Tr2.

The emitter of the transistor Tr1 and the corrector of the transistor Tr2 are connected to the positive terminal of the capacitor C2 and to the collector of a transistor Tr3. Notably, a diode D1 is connected between the emitter and the collector of the transistor Tr3.

The positive terminal of a capacitor C1 is connected to the emitter of the transistor Tr3. In this manner, the capacitor C1 is connected in parallel to the battery Bt via the transistors Tr1 to Tr3 and the diode D1.

The battery Bt is similar to the battery 12. Each of the capacitors C1 and C2 is preferably a large-capacitance capacitor having a large capacitance per unit volume, a low resistance, and a high output density, such as an electric double layer capacitor. Notably, although the capacitance of the capacitors C1 and C2 may be determined freely in consideration of the balance between capacitance and volume occupied, the capacitance is desirably 9 F or more.

Each of the capacitors C1 and C2 may be composed of a plurality of serially connected capacitors. In this case, each constituent capacitor may have a reduced withstanding voltage.

The positive terminal of the capacitor C2 and the collector of the transistor Tr3 are connected to the positive terminal of the electricity accumulator 12'; and the negative electrode of the battery Bt and the negative electrode of the capacitor C1 are connected to the negative terminal of the electricity accumulator 12'.

In the electricity accumulator 12' having the above-described configuration, electric power which is output from the battery Bt, the capacitor C1, and the capacitor C2, respectively, and electric power which is charged into the battery Bt, the capacitor C1, and the capacitor C2, respectively, are controlled through switching of the transistors Tr1 to Tr3.

In FIG. 2, reference numeral 13 denotes an inverter, which serves as a drive control apparatus (i.e., a load). The inverter 13 converts direct current from the fuel cell 11 or the battery 12 to alternating current and supplies the alternating current to a motor 14, which serves as a drive motor for rotating wheels of the vehicle. The motor 14 functions as a generator as well, and generates so-called regenerative current (electric power) when the vehicle decelerates. In the present embodiment, when the motor 14 is rotated by the wheels to thereby generate electric power, the motor 14 brakes the wheels; i.e., functions as a braking apparatus (i.e., a brake) of the vehicle. As will be described later, the regenerative current (electric power) is supplied to the battery 12 so as to charge the same.

Reference numeral 15 denotes a battery-charge control circuit, which is a parallel circuit composed of a thyristor 15b and an IGBT (insulated gate bipolar transistor) 15a, which is a high-speed switching element serving as a charging switching element. The IGBT 15a allows current of about 200 A to flow therethrough.

Reference numeral 16 denotes a battery-discharge control circuit serving as a stet-up control circuit. As in the case of the battery-charge control circuit 15, the battery-discharge control circuit 16 is a parallel circuit composed of a thyristor 16b and an IGBT 16a, which serves as a step-up switching element. The IGBT 16a allows current of about 200 A to flow therethrough.

Reference 17 denotes a reactor which allows current of about 200 A to flow therethrough. In conjunction with the battery-discharge control circuit 16, the reactor 17 constitutes a step-up circuit to thereby increase the output voltage of the battery 12.

The IGBT 16a of the battery-discharge control circuit 16 is turned on and off by means of a switching signal of predetermined frequency (e.g., about 20 kHz). When the IGBT 16a is turned on, direct current output from the battery 12 flows through the reactor 17, so that energy is accumulated in the reactor 17. When the IGBT 16a is turned off, a voltage corresponding to the energy accumulated in the reactor 17 is added to the output voltage of the battery 12 to thereby increase the output voltage. Although the stepped-up output voltage of the battery 12 can be adjusted freely by means of the switching signal, the stepped-up output voltage of the battery 12 is adjusted to be slightly higher than the output voltage of the fuel cell 11.

The thyristor 16b of the battery-discharge control circuit 16 prevents the insulation between the emitter and the collector of the IGBT 16a from being broken down by counter electromotive force generated between the emitter and the collector when the IGBT 16a is turned off.

Reference numeral 18 denotes a current sensor for measuring current flowing through a relevant portion of the circuit. Reference numeral 19 denotes a thyristor which is disposed as a diode element for preventing supply of current (electric power) from the load or the secondary battery to the fuel cell.

Reference numeral 20 denotes a hybrid electronic control unit, which includes computation means such a CPU or MPU, storage means such as semiconductor memory, and input/output interfaces. The electronic control unit 20 measures currents and voltages at various locations of the fuel cell circuit 10 and controls operations of the battery-charge control circuit 15 and the battery-discharge control circuit 16. The electronic control unit 20 is connected to other sensors provided in the vehicle and other control units, such as a vehicle control unit 21, a fuel-cell control unit 22, and an ignition control unit 24, which will be described later, to thereby communicate therewith in order to comprehensively control the operation of the fuel cell circuit 10 in cooperation with other sensors and other units.

The electronic control unit 20 may be an independent unit or may be a portion of another control unit such as the vehicle control unit 21.

In the present embodiment, the electronic control unit 20 includes two input/output interfaces for the current sensors 18, two input/output interfaces for voltage measurement, an input/output interface for the battery-charge control circuit 15, an input/output interface for the battery-discharge control circuit 16, an input/output interface for the vehicle control unit 21, an input/output interface for the fuel-cell control unit 22, and an input/output interface for the ignition control unit 24. The electronic control unit 20 further includes a power-source interface which is connected to a power-source battery 23 serving as a power source.

The vehicle control unit 21 includes computation means such a CPU or MPU, storage means such as semiconductor memory, and input/output interfaces. The vehicle control unit 21 detects vehicle speed, atmospheric temperature, accelerator opening, etc., and comprehensively controls the operation of the entire vehicle including a transmission and a brake system. In a typical vehicle, the accelerator opening is detected through detection of a degree of depression of an accelerator pedal (throttle pedal). However, when instead of the accelerator pedal another type of an accelerator, such as a rotary-type accelerator grip, a joystick, a bar handle, or a rotary dial, is used as means for controlling the output or speed of the vehicle, the accelerator opening is detected on the basis of movement amount thereof.

The fuel-cell control unit 22 includes computation means such a CPU or MPU, storage means such as semiconductor memory, and input/output interfaces. The fuel-cell control unit 22 detects flow rates of hydrogen, oxygen, air, etc., supplied to the fuel cell 11, temperature, as well as output voltage of the fuel cell 11, and controls operation of an apparatus for supplying a fuel and an oxidizer to the fuel cell 11. Specifically, the fuel-cell control unit 22 controls operations of an oxidizer supply source 32, a fuel-pressure regulation valve 26, a fuel supply solenoid valve 27, and a fuel discharge solenoid valve 28, which will be described later. Further, the fuel-cell control unit 22 comprehensively controls the operation of the apparatus for supplying a fuel and an oxidizer to the fuel cell 11 in cooperation with other sensors and other control units.

The power-source battery 23 is a battery which can repeat discharge upon charging, such as a lead-acid battery, a nickel-cadmium battery, a nickel-hydrogen battery, a lithium ion battery, or a sodium sulfur battery. The power-source battery 23 supplies direct current of 12 V to the electronic control unit 20. The power-source battery 23 may be used as a power source for auxiliary equipment such as a radio, power windows, etc. of the vehicle.

The ignition control unit 24 is adapted to start the fuel cell circuit. When a driver of the vehicle turns the ignition switch on, the ignition control unit 24 transmits a signal output from the ignition switch to the electronic control circuit 20 and other units.

Figure 7:
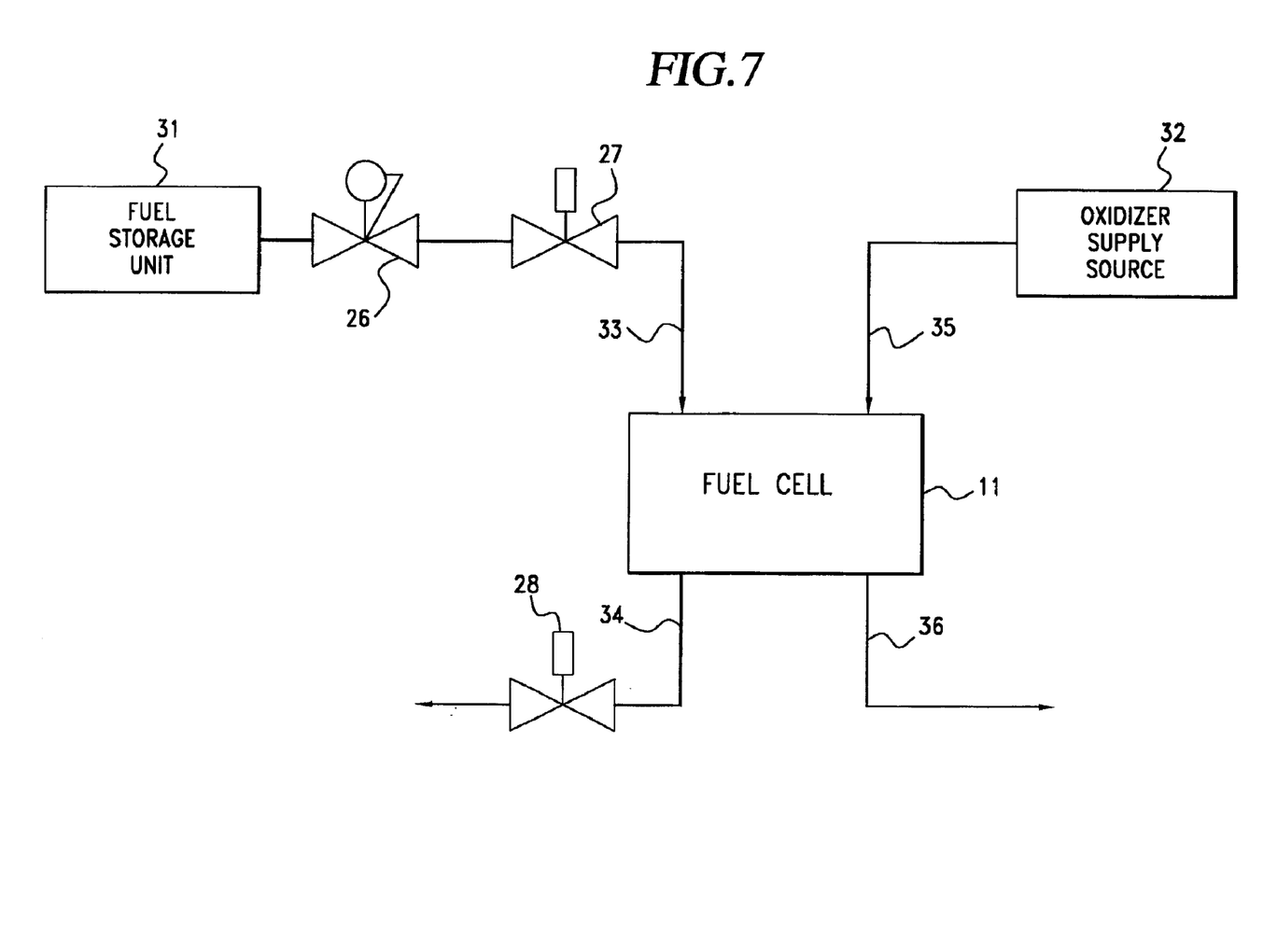
FIG. 7 is a diagram showing an apparatus for supplying a fuel and an oxidizer to a fuel cell according to a third embodiment of the present invention.

FIG. 7 shows an apparatus which is used in the present embodiment to supply to the fuel cell 11 hydrogen gas serving as a fuel and air serving as an oxidizer. Hydrogen gas is supplied from a fuel storage unit 31 such as a hydrogen storage alloy or a hydrogen gas cylinder to the fuel cell 11 via a fuel supply line 33. The fuel-pressure regulation valve 26 and the fuel supply solenoid valve 27 are disposed in the fuel supply line 33. The fuel storage unit 31 has a sufficiently large capacity and can supply hydrogen gas of sufficiently high pressure at all times.

The fuel-pressure regulation valve 26 may be a butterfly valve, a regulator valve, a diaphragm valve, a mass-flow controller, or a sequence valve, or any other suitable valve, insofar as a valve selected as the fuel-pressure regulation valve 26 can adjust to a preset level the pressure of hydrogen gas discharged from the valve. Notably, although the pressure adjustment may be performed manually, the pressure adjustment is desirably performed by means of an actuator such as an electric motor, a pulse motor, or an electromagnet. The fuel supply solenoid valve 27 is of a so-called on-off type and is operated by means of an actuator such as an electric motor, a pulse motor, or an electromagnet.

Hydrogen gas discharged from the fuel cell 11 is discharged to the atmosphere via a fuel discharge line 34. Notably, instead of being discharged to the atmosphere, hydrogen gas may be collected and returned to the fuel storage unit 31. The fuel discharge solenoid valve 28 is disposed in the fuel discharge line 34. The fuel discharge solenoid valve 28 has a configuration which is substantially identical with that of the fuel supply solenoid valve 27.

Meanwhile, air serving as an oxidizer is supplied from an oxidizer supply source 32, such as an air supply fan or an air cylinder, to the fuel cell 11 via an oxidizer supply line 35. Instead of air, oxygen may be used as an oxidizer. Air discharged from the fuel cell 11 is discharged to the atmosphere via an oxidizer discharge line 36. Valve means is disposed in neither the oxidizer supply line 35 nor the oxidizer discharge line 36. A water jetting nozzle for supplying moisture to the solid electrolyte film of the fuel cell 11 may be provided in the oxidizer supply line 35; and a condenser for condensing and removing moisture contained in air discharged from the fuel cell 11 may be provided in the oxidizer discharge line 36 (see Japanese Patent Application Laid-Open No. 11-317236).

Next, operation of the fuel cell apparatus having the above-described configuration will be described.

Figure 4:
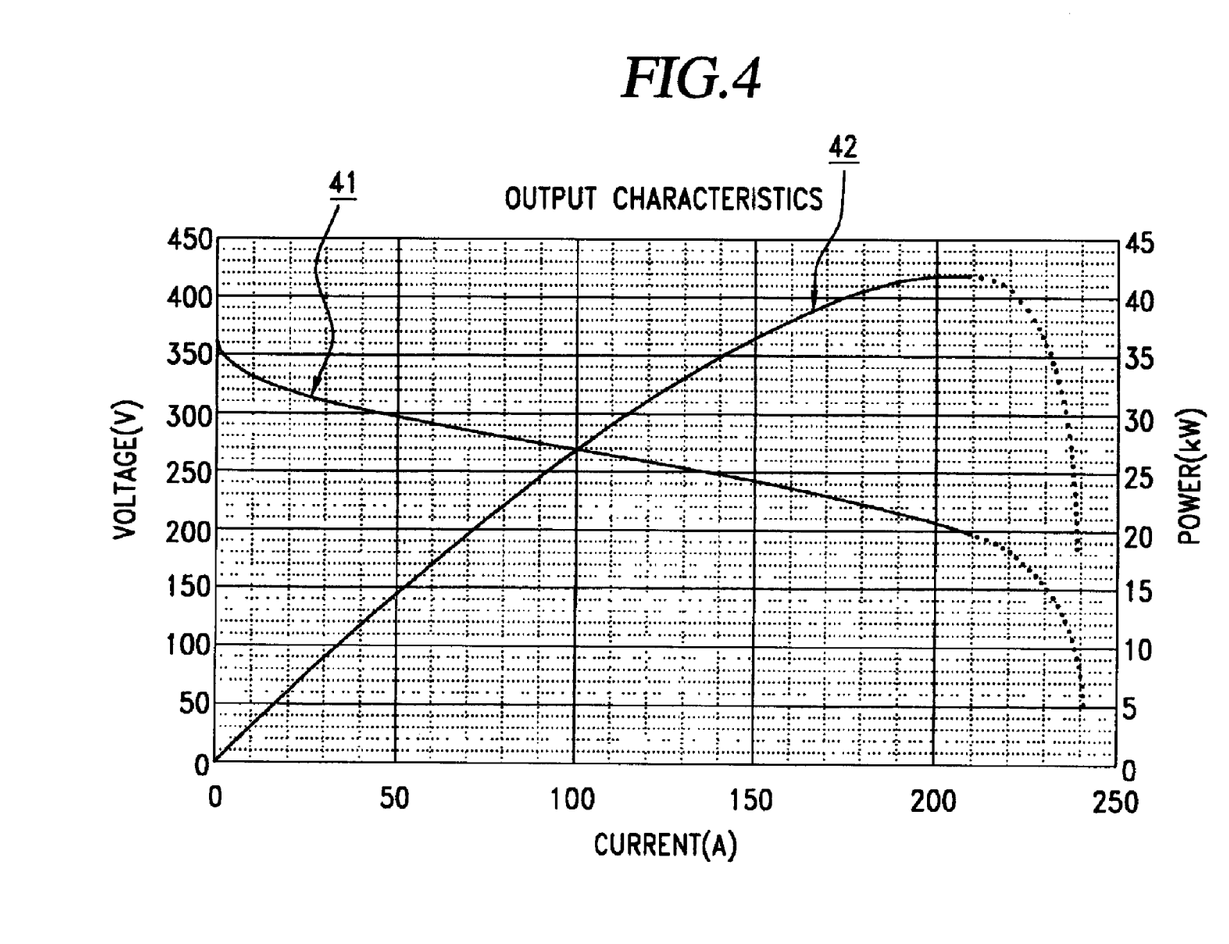
FIG. 4 is a graph showing the characteristic of the fuel cell used in the first embodiment of the present invention.
Figure 5:
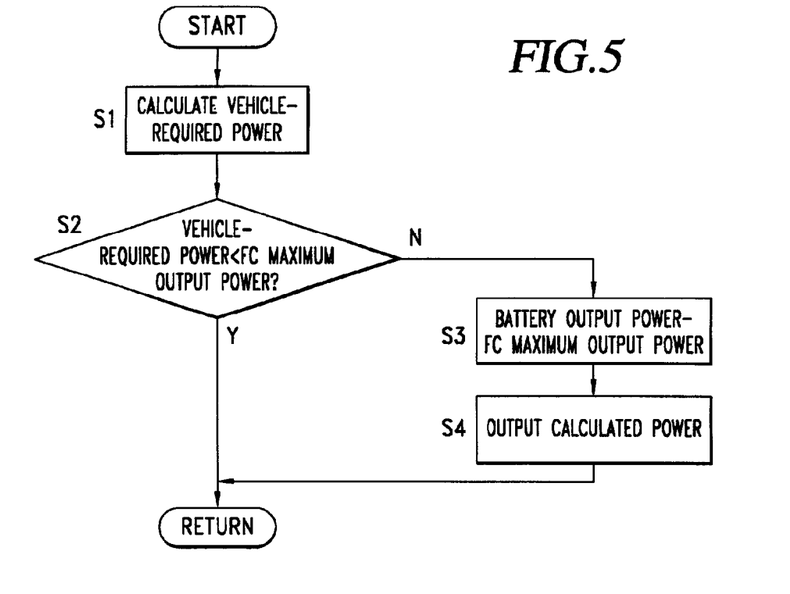
FIG. 5 is a flowchart showing a method of controlling a fuel cell apparatus according to the first embodiment of the present invention.

FIG. 4 is a graph showing the characteristics of the fuel cell used in the first embodiment of the present invention; and FIG. 5 is a flowchart showing a method of controlling the fuel cell apparatus according to the first embodiment of the present invention. In FIG. 4, the horizontal axis represent current (unit: A), and the vertical axis represent voltage (unit: V) and power (unit: kW).

Here, we assume that hydrogen gas serving as a fuel is supplied to the fuel cell 11 at a required flow rate, and air serving as an oxidizer is sufficiently supplied to the fuel cell 11; that the ion exchange films of the hydrogen and air electrodes of the fuel cell 11 contain sufficient moisture; that the temperature of the fuel cell 11 is high enough to fall within the operation temperature range; and that the members that constitute the fuel cell 11 have undergone little deterioration with time. In other words, the good conditions which enable the fuel cell 11 to output the predetermined maximum generatable current and maximum output are maintained at all times.

In FIG. 4, reference numeral 41 denotes a curve representing the voltage-current characteristic of the fuel cell 11. The curve 41, representing the voltage-current characteristic of the fuel cell 11, generally slopes downward toward the right, which means that voltage decreases as current increases, as in the case of an ordinary PEM-type fuel cell. The slope becomes steep after passage of an inflection point; i.e., when the current has increased to about 225 A. The ranges of current and voltage output from the fuel cell 11 are determined from the curve 41, which represents the voltage-current characteristic of the fuel cell 11.

The curve 41 shows that the fuel cell 11 operates stably when the current is not greater than 225 A. Further, since a voltage corresponding to 225A is about 180 V, the fuel cell 11 operates stably when the voltage is not less than 180 V.

Meanwhile, reference numeral 42 denotes a curve representing the power-current characteristic of the fuel cell 11. The curve 42, representing the power-current characteristic of the fuel cell 11, generally slopes upward toward the right, which means that power increases with current. After passage of a peak; i.e., when the power has reached 42 kW, the curve steeply slops downward toward the right. The range of power output from the fuel cell 11 is determined from the curve 42, which represents the power-current characteristic of the fuel cell 11.

The curve 42 shows that the fuel cell 11 operates stably when the power is not greater than 42 kW. Notably, as described above, the fuel cell 11 serves as a power source whose output impedance is almost zero.

From the above, it is understood that the fuel cell 11 can be operated stably at voltage not less than 180 V, current not greater than 225 A, and power not greater than 42 kW. Therefore, in the present embodiment, the voltage of 180 V will be referred to as the lowest generatable voltage of the fuel cell 11; the current of 225 A will be referred to as the maximum generatable current of the fuel cell 11; and the power of 42 kW will be referred to as the maximum output of the fuel cell 11.

As in the case of an ordinary PEM-type fuel cell, the output current of the fuel cell 11 is increased in order to increase the output power, with the result that the output voltage changes in accordance with the curve 41. For example, in order to cause the fuel cell 11 to output 20 kW, the output current is increased to about 70 A, so that the output voltage becomes about 290 V, and the desired power of 20 kW is output.

Therefore, the fuel cell apparatus is operated in such a manner that current is supplied from only the fuel cell 11 when current to be supplied to the motor 14 via the inverter 13; i.e., required current, is less than the maximum generatable current of the fuel cell 11, whereas current is supplied from the battery 12 as well as the fuel cell 11 when the required current exceeds the maximum generatable current. Since the open-circuit terminal voltage of the battery 12 is 210 V, no current (electric power) is supplied from the battery 12 until the required current reaches 200 A, which corresponds to 210 V on the curve 41. In an actual vehicle, the required current (electric power) includes not only the current to be supplied to the motor 14 via the inverter 13, but also current to be supplied to vehicle auxiliary apparatuses, which are electrically-driven parts to be mounted on the vehicle, such as wipers and a stereo, and current to be supplied to fuel-cell auxiliary apparatuses, which are electrically-driven parts for operating the fuel cell, such as an air supply fan and valves.

Notably, when the output voltage of the battery 12 is increased to the terminal voltage of the fuel cell 11 by means of a step-up circuit, electric power can be positively supplied from the battery 12.

As is apparent from the curve 41, when the required current reaches 200 A, the terminal voltage of the fuel cell 11 becomes equal to the open-circuit terminal voltage of the battery 12; i.e., 210 V. Therefore, when the current exceeds 200 A, electric power is supplied from the battery 12 as well.

When the required current exceeds the maximum generatable current; i.e., 225 A, the fuel cell 11 supplies the maximum generatable current, and the battery 12 supplies the difference between the required current and the maximum generatable current.

Further, the fuel cell apparatus is operated in the following manner. When electric power to be supplied to the motor 14 via the inverter 13; i.e., required power, is less than the maximum output power of the fuel cell 11, electric power is supplied from only the fuel cell 11. When the required electric power exceeds the maximum output power, in addition to electric power from the fuel cell 11, electric power corresponding to the difference between the required electric power and the maximum output power is supplied from the battery 12. In an actual vehicle, the required electric power includes not only the electric power to be supplied to the motor 14 via the inverter 13, but also electric power to be supplied to the vehicle auxiliary apparatuses and the fuel-cell auxiliary apparatuses.

In the present embodiment, the characteristics of the fuel cell 11 as shown in FIG. 4 are stored in advance in the storage means of the electronic control unit 20. On the basis of signals which are transmitted from the vehicle control unit 21 and which represent vehicle speed, accelerator opening, etc., required power to be supplied to the motor 14 is calculated by means of calculation means, and required current corresponding to the required power is determined on the basis of the characteristics of the fuel cell 11 as shown in FIG. 4.

Meanwhile, the traveling mode of the vehicle is detected, and generation of regenerative current (electric power) is predicted on the basis of the detected traveling mode. When generation of regenerative current (electric power) is expected, the output currents (output powers) of the fuel cell 11 and the battery 12 are controlled on the basis of the characteristics of the fuel cell 11 as shown in FIG. 4, in order to enable the regenerative current (electric power) to be charged into the battery 12.

Here, the basic operation of the fuel cell apparatus 10 performed on the basis of the characteristics of the fuel cell 11 as shown in FIG. 4 will be described.

When the required current is not greater than 200 A and current is supplied from the fuel cell 11 only, the IGBT 15a of the battery-charge control circuit 15 and the IGBT 16a of the battery-discharge control circuit 16 are each brought into an off state.

In this case, since hydrogen gas serving as a fuel and air serving as an oxidizer are sufficiently supplied to the fuel cell 11 at all times, even when the required current (electric power) varies, current (electric power) corresponding to the required current (electric power) is supplied from the fuel cell 11 automatically. Accordingly, the output current (electric power) of the fuel cell 11 is not required to be controlled in accordance with variation in the required current (electric power). Notably, the current supplied from the fuel cell 11 is measured by means of the current sensor 18, and at all times the electronic control unit 20 judges whether the current is not greater than 200 A. The voltage output from the fuel cell 11 is also detected by the electronic control unit 20 at all times.

If the IGBT 16a of the battery-discharge control circuit 16 is maintained in the off state even after the required current or the current measured by the current sensor 18 has exceeded 200 A, the current supplied from the battery 12 does not increase very much.

In order to positively supply current (electric power) from the battery 12 as well, the electronic control unit 20 turns the IGBT 16a of the battery-discharge control circuit 16 on and off by means of a switching signal of predetermined frequency (e.g., 20 kH). When the IGBT 16a is turned on, direct current output from the battery 12 flows through the reactor 17, so that energy is accumulated in the reactor 17. When the IGBT 16a is turned off, a voltage corresponding to the energy accumulated in the reactor 17 is added to the output voltage of the battery 12, so that the increased output voltage becomes substantially equal to the output voltage of the fuel cell 11.

Current corresponding to the difference between the required current and the current supplied from the fuel cell 11 is supplied from the battery 12 to the motor 14 via the inverter 13. The current supplied from the battery 12 is measured by the corresponding current sensor 18 and is checked by the electronic control unit 20.

Next will be described the basic operation of the fuel cell circuit 10 at the time when the battery 12 is charged due to a decrease in SOC (state of charge; i.e., residual capacity) of the battery 12.

When the vehicle decelerates, the motor 14 functions as a generator to thereby generate regenerative alternating current. The regenerative alternating current is converted to regenerative direct current by the inverter 13. At this time, the electronic control unit 20 turns the IGBT 15a of the battery-charge control circuit 15 on by means of a switching signal. Therefore, the regenerative direct current is supplied to the battery 12 via the IGBT 15a in order to charge the battery 12.

The regenerative current is measured by the corresponding current sensor 18 and is checked by the electronic control unit 20 at all times. Further, the voltage of the battery 12 is also checked by the electronic control unit 20 at all times. When the SOC of the battery 12 increases sufficiently, the IGBT 15a is turned off. When the regenerative current is excessively large, the IGBT 15a is turned on and off by means of a switching signal of predetermined frequency to thereby control the current flowing through the IGBT 15a.

Therefore, charging is not performed when the SOC of the battery 12 is sufficiently high, and excessively large current is not supplied to the battery 12. Thus, the battery 12 is prevented from being broken due to excessive charging.

When the battery 12 requires charging due to a decrease in the SOC of the battery 12 and no regenerative current (electric power) is generated, current (electric power) is supplied from the fuel cell 11 in order to charge the battery 12. In this case, the electronic control unit 20 turns the IGBT 15a of the battery-charge control circuit 15 on by means of a switching signal. Therefore, the regenerative direct current is supplied to the battery 12 via the IGBT 15a in order to charge the battery 12.

Notably, the current output from the fuel cell 11 and the current supplied to the battery 12 are measured by the current sensors 18 and are checked by the electronic control unit 20 at all times. Further, the voltage of the battery 12 is also checked by the electronic control unit 20 at all times. The IGBT 15a is turned off when the SOC of the battery 12 increases sufficiently, when the current supplied from the fuel cell 11 reaches 200 A, or when the required current to be supplied to the motor 14 is large. When the current supplied to the battery 12 is excessively large, the IGBT 15a is turned on and off by means of a switching signal of predetermined frequency to thereby control the current flowing through the IGBT 15a.

Therefore, charging is not performed when the SOC of the battery 12 is sufficiently high, and excessively large current is not supplied to the battery 12. Thus, the battery 12 is prevented from being broken due to excessive charge. Further, an excessively large load is not imposed on the fuel cell 11, and the case in which the required current cannot be supplied can be avoided.

Next, there will be specifically described a method of controlling the fuel cell apparatus of the present embodiment in such a manner that the load acting on the fuel cell 11 is maintained within a predetermined range. In the present embodiment, the maximum output power of the fuel cell 11 is employed as a reference which is used to maintain the load acting on the fuel cell 11 within the predetermined range.

First, the vehicle control unit 21 detects vehicle speed and accelerator opening; i.e., the degree of depression of the accelerator pedal of the vehicle by the driver, and transmits them to the electronic control unit 20. In response thereto, the electronic control unit 20 calculates vehicle-required power; i.e., output power to be generated by the motor, on the basis of the vehicle speed and the accelerator opening (step S1).

Subsequently, the electronic control unit 20 judges whether the vehicle-required power is less than the maximum output power of the fuel cell 11 (step S2). When the vehicle-required power is less than the maximum output power, the electronic control unit 20 ends the control.

When the vehicle-required power is not less than the maximum output power, the electronic control unit 20 calculates the difference between the vehicle-required power and the maximum output power of the fuel cell 11 as an output power level of the battery 12 (step S3). Subsequently, the electronic control unit 20 turns the IGBT 16a of the battery-discharge control circuit 16 on and off by means of a switching signal of predetermined frequency to thereby attain the output power level (step S4). Subsequently, the electronic control unit 20 ends the control.

As described above, in the present embodiment, when the vehicle-required power exceeds the maximum output power of the fuel cell 11, the difference between the vehicle-required power and the maximum output power of the fuel cell 11 is calculated, and control is performed in such a manner that the battery 12 outputs current corresponding to the difference.

Since the above-described control is realized through performance of feed-forward control of the output of the battery 12, quick response is attained, and the fuel cell apparatus can be controlled at high speed in such a manner that the fuel cell 11 operates within a stable range.

Next, a second embodiment of the present invention will be described. Descriptions for components having the same structures as those of the first embodiment are omitted, as are descriptions for the same operations as those of the first embodiment.

Figure 6:
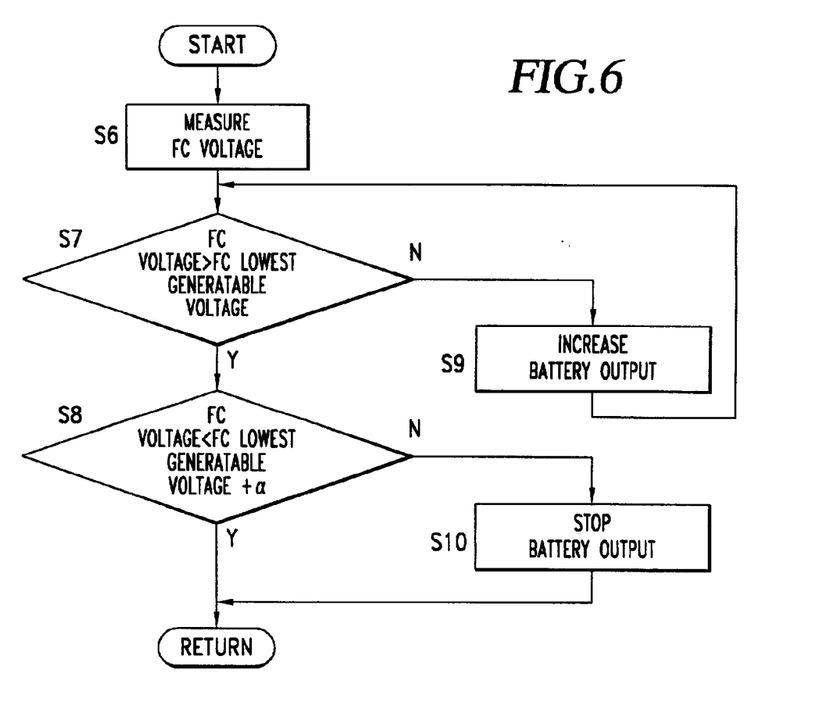
FIG. 6 is a flowchart showing a method of controlling a fuel cell apparatus according to a second embodiment of the present invention.

FIG. 6 is a flowchart showing a method of controlling a fuel cell apparatus according to a second embodiment of the present invention.

The present embodiment differs from the first embodiment in that, instead of the maximum output power of the fuel cell 11, the lowest generatable voltage of the fuel cell 11 is employed as a reference which is used to maintain the load acting on the fuel cell 11 within the predetermined range.

First, the electronic control unit 20 measures the terminal voltage or output voltage of the fuel cell 11 (step S6) and judges whether the measured output voltage is greater than the lowest generatable voltage of the fuel cell 11 (step S7). When the measured output voltage is greater than the lowest generatable voltage, the electronic control unit 20 judges whether the measured output voltage is greater than the sum of the lowest generatable voltage and a predetermined value a (step S8). When the measured output voltage is less than the sum, the electronic control unit 20 ends the control.

When it is judged in step S7 that the output voltage is not greater than the lowest generatable voltage, the electronic control unit 20 turns the IGBT 16a of the battery-discharge control circuit 16 on and off by means of a switching signal of predetermined frequency to thereby increase the output from the battery 12 (step S9), and then returns to step S7 in order to again judge whether the output voltage is greater than the lowest generatable voltage.

When it is judged in step S8 that the output voltage is not less than the sum of the lowest generatable voltage and the value α, the electronic control unit 20 turns the IGBT 16a of the battery-discharge control circuit 16 off in order to stop the output from the battery 12 (step S10), and then ends the control.

In the present embodiment, the output voltage of the fuel cell 11 is measured, and the output from the battery 12 is controlled in such a manner that the measured output voltage does not becomes lower than the lowest generatable voltage. However, the present embodiment may be modified so as to measure the output current of the fuel cell 11 and control the output from the battery 12 in such a manner that the measured output current does not becomes larger than the maximum generatable current. Alternatively, the present embodiment may be modified so as to measure the output power of the fuel cell 11 and control the output from the battery 12 in such a manner that the measured output power does not becomes larger than the maximum output power.

As described above, in the present embodiment, the output voltage, output current, or output power of the fuel cell 11 is measured, and the output from the battery 12 is controlled in such a manner that the measured value falls within a range in which the fuel cell 11 operates stably.

Since the above-described control is performed on the basis of feedback of the output (electric power) of the fuel cell 11, the required power can be provided reliably.

Next, a third embodiment of the present invention will be described. Descriptions for components having the same structures as those of the first or second embodiment are omitted, as are descriptions for the same operations as those of the first or second embodiment.

Next, there will be described operation of the apparatus of FIG. 7, which is adapted to supply to the fuel cell 11 hydrogen serving as a fuel and air serving as an oxidizer.

The present embodiment differs from the first and second embodiments in terms of the apparatus for supplying hydrogen gas to the fuel cell 11 and the operation thereof. First, a pressure of hydrogen gas supplied to the fuel cell 11 which the fuel cell 11 requires to output the maximum power is determined. When the flow rate of the supplied hydrogen gas becomes less than the flow rate which the fuel cell 11 requires to output the maximum power, carbon or other components contained in members that constitute the fuel cell 11 cause reaction, with the result that the fuel cell 11 is burned out. Therefore, hydrogen gas must be supplied to the fuel cell 11 at a sufficiently high flow rate in order to prevent reaction of carbon or other components contained in the members. The results of various experiments show that in the case of the fuel cell 11 of the present embodiment, when the pressure of hydrogen gas supplied to a plurality of grooves of unillustrated fuel electrodes (hydrogen electrodes) of the fuel cell 11 is maintained at 0.5 kgf/cm² or higher, hydrogen gas can be considered to be supplied to the fuel cell 11 at a sufficiently high flow rate in order to prevent reaction of carbon or other components contained in the members.

In view of the foregoing, in the present embodiment, through an experiment, simulation, or any other suitable method, a pressure of hydrogen gas flowing through the fuel supply line 33 is previously set to a certain level such that the pressure of hydrogen gas supplied to the plurality of grooves of the fuel electrodes becomes 0.5 kgf/cm² or higher when the fuel cell 11 outputs the maximum power. The fuel pressure regulation valve 26 is set in such a manner that the pressure of hydrogen gas which flows from the fuel storage unit 31 into the fuel supply line 33, as measured at the exit of the fuel pressure regulation valve 26, attains the set pressure. When the pressure of hydrogen gas supplied to the plurality of grooves of the fuel electrodes is excessively high, electrolyte films and other members may be damaged. Therefore, the pressure is desirably set not to be excessively high.

In the present embodiment, once the fuel pressure regulation valve 26 is adjusted in such a manner that the pressure of hydrogen gas flowing out from the exit of the fuel pressure regulation valve 26 attains a preset constant level, the fuel pressure regulation valve 26 is not adjusted and is maintained as is during operation of the vehicle.

The oxidizer supply source 32 operates to continuously supply air to the air electrodes of the fuel cell 11 at a constant flow rate. In this case, the flow rate of the supplied air is set sufficiently higher than a flow rate of air which the fuel cell 11 requires to output the maximum power.

When the fuel cell 11 is to be started, the fuel discharge solenoid value 28 is first turned on to thereby open the flow path. As a result, hydrogen gas remaining within the fuel cell 11 and air having entered the fuel cell 11 can be discharged via the fuel discharge line 34. Subsequently, the fuel supply solenoid valve 27 is turned on so as to supply hydrogen gas from the fuel storage unit 31 to the fuel cell 11 via the fuel supply line 33. At this time, since the fuel discharge solenoid value 28 is in the on state with the flow path opened, the pressure within the plurality of grooves of the fuel electrodes does not increase abruptly. Therefore, the electrolyte films and other members are not damaged. In this manner, the hydrogen gas remaining within the fuel cell 11 and air having entered the fuel cell 11 are purged by the supplied hydrogen gas (see Japanese Patent Application Laid-Open No. 11-317236).

Subsequently, when the fuel cell 11 enters steady operation, the fuel discharge solenoid value 28 is turned on and off repeatedly. For example, the fuel discharge solenoid value 28 repeats a cycle composed of, for example, a 2-sec on period and a 58-sec off period. Meanwhile, the fuel supply solenoid valve 27 maintains an on state.

As described above, in the present embodiment, the pressure of hydrogen gas supplied to the fuel cell 11 is set to a level that corresponds to a flow rate of hydrogen gas which the fuel cell 11 requires to output the maximum power. Therefore, the flow rate of hydrogen gas supplied to the fuel cell 11 can be controlled to a proper level, thereby preventing damage to the fuel cell 11 and enabling stable output of electric power from the fuel cell 11.

Since the flow rate of hydrogen gas can be controlled through on/off control of the fuel supply solenoid valve 27 and the fuel discharge solenoid valve 28, the structure of the fuel cell apparatus can be simplified, and cost can be reduced.

The present invention is not limited to the above-described embodiments and may be modified in various manners on the basis of the gist of the present invention, and these modifications are not excluded from the scope of the present invention.

What is claimed is:

1. A fuel cell apparatus comprising:
   a fuel cell connected to a load;
   an electricity accumulator connected in parallel to said fuel cell;
   a step-up circuit provided between said electricity accumulator and said load, for increasing voltage output from said electricity accumulator; and
   a control circuit for causing said step-up circuit to operate, when electric power that said load requires is greater than electric power that said fuel cell supplies, so that said electricity accumulator outputs electric power corresponding to a difference between the supplied electric power and the required electric power, to thereby prevent said fuel cell from outputting electric power out of a predetermined range.

2. A fuel cell apparatus according to claim 1, wherein said load is a drive control unit for a drive motor which drives the vehicle.

3. A fuel cell apparatus according to claim 1, wherein said fuel cell outputs electricity in such a manner that output voltage does not become lower than the lowest generatable voltage, output current does not exceed the maximum generatable current, and output power does not exceed the maximum output power.

4. A fuel cell apparatus according to claim 1, wherein said electricity accumulator outputs electricity when the electric power that said load requires exceeds the maximum output power of said fuel cell.

5. A fuel cell apparatus according to claim 1, wherein said electricity accumulator outputs electricity when output voltage of said fuel cell becomes lower than the lowest generatable voltage, when output current of said fuel cell exceeds the maximum generatable current, or when output power of said fuel cell exceeds the maximum output power.

6. A fuel cell apparatus according to claim 1, wherein fuel gas is supplied from a fuel storage unit to said fuel cell at constant pressure.

7. A fuel cell apparatus according to claim 6, wherein the fuel gas is supplied in such a manner that the pressure of the fuel gas becomes constant within grooves of fuel electrodes of said fuel cell.

8. A fuel cell apparatus according to claim 6, wherein said line includes a fuel supply line and a fuel discharge line; a fuel supply solenoid valve is disposed in said fuel supply line; and a fuel discharge solenoid valve is disposed in said fuel discharge line, wherein said fuel supply solenoid valve and said fuel discharge solenoid valve are turned on and off in order to regulate the pressure of the fuel gas.

9. A fuel cell apparatus according to claim 6, wherein a fuel pressure regulation valve is disposed in said line and is operated in order to regulate the pressure of the fuel gas.

10. A fuel cell apparatus according to claim 1, wherein said fuel cell apparatus further comprises a fuel supply apparatus for supply fuel gas to said fuel cell; said fuel supply apparatus comprising a fuel storage unit, a supply line extending from said fuel storage unit to said fuel cell, and a valve disposed in said line, wherein said valve is operated in such a manner that the fuel gas is supplied to said fuel cell at constant pressure.

11. A fuel cell apparatus comprising a fuel cell, a load connected to an output terminal of said fuel cell, and an electricity accumulation circuit connected in parallel to said fuel cell with respect to said load, wherein said electricity accumulation circuit comprises:
    an electricity accumulator;
    a step-up circuit for increasing voltage output from said electricity accumulator to supply electric power to said load;
    a charging circuit for supplying electric power output from said fuel cell to said electricity accumulator to charge said electricity accumulator; and
    a traveling state detector for detecting a traveling state of a vehicle, wherein
    said step-up circuit is operated in accordance with the traveling state of the vehicle as detected by said traveling state detector so that voltage output from said fuel cell is within a predetermined range, to thereby supply electric power of said electricity accumulator to said load.

12. A fuel cell apparatus comprising a fuel cell connected to a load, an electricity accumulation circuit connected in parallel to said fuel cell with respect to said load, and a diode element disposed for preventing supply of electric power from said load or said electricity accumulation circuit to said fuel cell, wherein said electricity accumulation circuit comprises:
    a switching element for charging and a switching element for step-up connected in series;
    an electricity accumulator connected in parallel to said switching element for step-up via a reactor; and
    a traveling state detector for detecting a traveling state of a vehicle, wherein
    said switching element for step-up is operated in accordance with the traveling state of the vehicle as detected by said traveling state detector so that voltage output from said fuel cell is within a predetermined range, to thereby supply electric power of said electricity accumulator to said load.

* * * * *